United States Patent [19]

Vargo

[11] 4,321,064
[45] Mar. 23, 1982

[54] FILTER APPARATUS AND METHOD OF FILTERING

[76] Inventor: John W. Vargo, 3540 Ridge Rd., Cleveland, Ohio 44102

[21] Appl. No.: 190,417

[22] Filed: Sep. 24, 1980

[51] Int. Cl.³ .................... B01D 45/06; B01D 45/08; F23J 11/00
[52] U.S. Cl. .......................................... 55/1; 55/97; 55/308; 55/354; 55/446; 55/521; 55/DIG. 46; 98/115 SB; 118/DIG. 7; 210/320
[58] Field of Search .................. 55/97, 307, 308, 354, 55/482, 486, 488, 489, 499, 500, 521, 528, DIG. 46, 445, 446, 485, 1; 210/489, 492, 493.1, 493.5, 322, 320; 98/115 SB; 118/DIG. 7

[56] References Cited

U.S. PATENT DOCUMENTS

| | | | |
|---|---|---|---|
| 913,802 | 3/1909 | Barker | 55/446 |
| 1,857,348 | 5/1932 | Bokenkroger | 55/446 |
| 2,019,186 | 10/1935 | Kaiser | 55/482 |
| 2,619,188 | 11/1952 | Haw et al. | 55/489 |
| 2,752,003 | 6/1956 | Hersey, Jr. et al. | 98/115 SB |
| 2,875,680 | 3/1959 | Forshe | 55/354 |
| 3,075,337 | 1/1963 | Andreae | 55/446 |
| 3,458,977 | 8/1969 | Young et al. | 55/521 |
| 3,744,222 | 7/1973 | Delao | 55/446 |
| 3,902,455 | 9/1975 | Lehmann et al. | 55/354 |
| 4,008,060 | 2/1977 | Andreae | 55/486 |
| 4,237,780 | 12/1980 | Truhan | 98/115 SB |

FOREIGN PATENT DOCUMENTS

| | | | |
|---|---|---|---|
| 660577 | 5/1938 | Fed. Rep. of Germany | 55/486 |
| 666465 | 10/1938 | Fed. Rep. of Germany | 55/489 |

Primary Examiner—David L. Lacey
Attorney, Agent, or Firm—Frederic M. Bosworth; Neil A. DuChez

[57] ABSTRACT

A filter comprising a flat sheet, a corrugated sheet adhered in faced relationship to said flat sheet, a first array of parallel spaced orifices formed in said flat sheet, and a second array of parallel spaced orifices formed in said corrugated sheet, orifices in said first array being disposed laterally in spaced relationship from orifices in said second array, orifices in said first array communicating with orifices in said second array through corrugations in said corrugated sheet.

A process for separating suspended particles from a fluid using the foregoing filter is disclosed. Use of the foregoing filter in a spray booth is also disclosed.

33 Claims, 7 Drawing Figures

U.S. Patent  Mar. 23, 1982  4,321,064
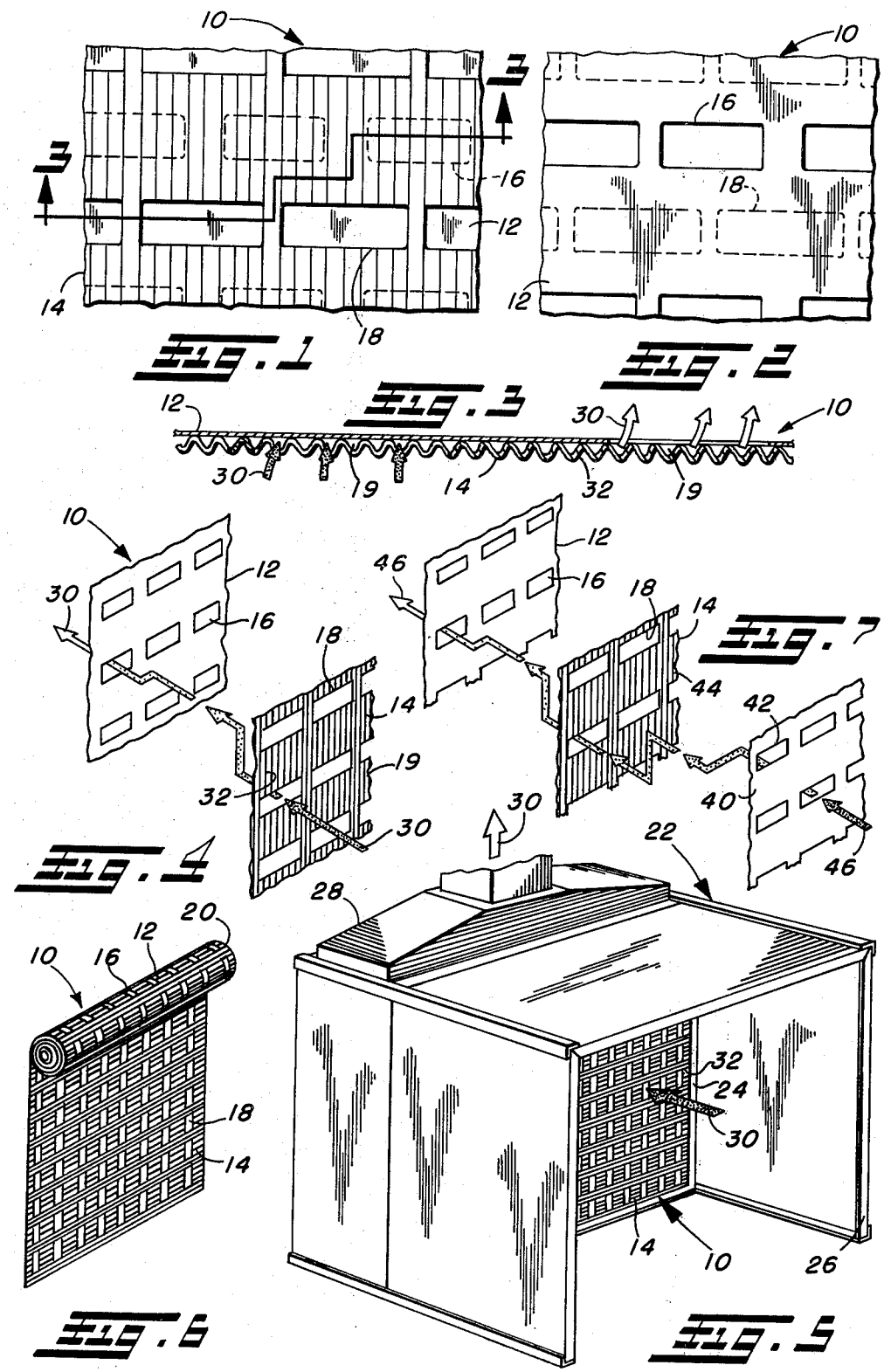

FILTER APPARATUS AND METHOD OF FILTERING

TECHNICAL FIELD

This invention relates to filter systems for removing particulate matter from fluid streams and, more particularly, to a novel filter apparatus. Specifically, the invention is directed to filter apparatus for use in spray booths.

BACKGROUND OF THE INVENTION

Present day techniques for the spray application of coatings are generally categorized in one of three basic spray application techniques. The first of these techniques is air atomization wherein the coating particles ride on an air stream from the spray gun to the product being coated. The second of these techniques is airless atomization wherein the coating material is atomized and propelled by hydraulic pressure. The third is electrostatic spraying wherein the coating material is atomized by air or airless techniques and the deposition of coating on the product being sprayed is by electrical attraction of the coating particles. With each of these spray techniques spray booths are commonly employed and usually required by federal or state regulatory agencies.

Present day spray booths are designed with the objectives of providing a safe working place, preventing pollution of the atmosphere and enhancing the quality of the product being sprayed. The rapid and thorough removal of volatile solvents and vehicle fumes from the premises is essential in many spray applications to meet the requirements of the Occupational Safety and Health Administration and insurance carriers. The air moving through the spray booth carries coating over-spray away from the product, avoiding the finish marring consequences of semi-dry coating particles settling on already coated surfaces. By effectively removing coating particles from the air being discharged to the outside, the spray booth eliminates a common cause of air pollution and thus helps the user avoid risking violations of legal requirements, particularly those of the Environmental Protection Agency, and prevents staining and dirtying of immediately adjacent property.

Numerous filter designs have been proposed for spray booth applications, but in each case these designs have been found to be inadequate due to the fact that they have either clogged too rapidly or have been cumbersome and costly in design. There exists a need for a replaceable filter for use with spray booths that is simple in construction and suitable for allowing large volumes of air to pass through with a minimal loss of efficiency.

U.S. Pat. No. 2,909,237 discloses a collapsible filter for separating particulate matter from a fluid stream. U.S. Pat. No. 3,075,337 discloses a replaceable filter medium that is particularly suited for use in spray booths. The filters disclosed in each of these patents, however, are complex in design and construction and do not offer the advantages of the present invention.

SUMMARY OF THE INVENTION

Filters of the type herein disclosed and claimed are useful in spray booth applications and offer the advantages of a simplified construction and design that permits the flow of large volumes of air to pass through with a minimal loss of efficiency. Filters embodying the present inventionn are easy to construct, conveniently packaged, easily replaced and, consequently, overcome many of the problems that have plagued the prior art.

Broadly stated, the invention contemplates a filter comprising a flat sheet, a corrugated sheet adhered in faced relationship to said flat sheet, a first array of parallel spaced orifices formed in said flat sheet, and a second array of parallel spaced orifices formed in said corrugated sheet, orifices in said first array being disposed laterally in spaced relationship from orifices in said second array, orifices in said first array communicating with orifices in said second array through corrugations in said corrugated sheet. Advantageously, said flat sheet and said corrugated sheet are formed from thin flexible sheets of a material suitable for filter applications and have elongated lengths and breadths. In a particularly advantageous embodiment said flat sheet and said corrugated sheet are made of paper.

Further the invention contemplates a process for separating suspended particles from a fluid stream comprising: providing a filter having a flat sheet, a corrugated sheet adhered in faced relationship to said flat sheet, the faced relationship of said flat sheet and said corrugated sheet defining a plurality of elongated channels formed between said flat sheet and said corrugated sheet, a first array of parallel spaced orifices formed in said flat sheet, and a second array of parallel spaced orifices formed in said corrugated sheet, orifices in said first array being disposed laterally in spaced relationship from orifices in said second array, orifices in said first array communicating with orifices in said second array through the channels formed between said corrugated sheet and said flat sheet; projecting said fluid stream against the corrugated sheet of said filter; accumulating a portion of the particles from said fluid stream on the facing of said corrugated sheet; passing said fluid stream through the orifices of said corrugated sheet; diverting the flow of said fluid stream into the channels formed between said flat sheet and said corrugated sheet; accumulating a portion of the particles of said fluid stream in said channels; and withdrawing said fluid stream from said filter through the orifices in said flat sheet. Alternatively, the invention contemplates a process similar to the foregoing process for separating suspended particles from a fluid stream with the exception that the fluid stream is initially projected against the flat sheet of said filter (rather than against the corrugated sheet) followed by the steps of: accumulating a portion of the particles in said fluid stream on the facing of said flat sheet; passing said fluid stream through the orifices of said flat sheet; diverting the flow of said fluid stream into the channels formed between said flat sheet and said corrugated sheet; accumulating a portion of the particles of said fluid stream in said channels; and withdrawing said fluid stream from said filter through the orifices in said corrugated sheet.

Further the invention contemplates a disposable filter medium packaged for transport and storage on rolls comprising a flat flexible sheet, a corrugated sheet adhered in faced relationship to said flat sheet, a first array of parallel spaced orifices formed in said flat sheet, and a second array of parallel spaced orifices formed in said corrugated sheet, orifices in said first array being disposed laterally in spaced relationship from orifices in said second array, orifices in said first array communicating with orifices in said second array through corrugations in said corrugated sheet.

Further the invention contemplates a spray booth with a filter comprising a flat sheet, a corrugated sheet adhered in faced relationship to said flat sheet, a first array of parallel spaced orifices formed in said flat sheet, and a second array of parallel spaced orifices formed in said corrugated sheet, orifices in said first array being disposed laterally in spaced relationship from orifices in said second array, orifices in said first array communicating with orifices in said second array through corrugations in said corrugated sheet.

In an alternate embodiment the invention contemplates a filter comprising a flat sheet, a corrugated sheet adhered in faced relationship to said flat sheet, another flat sheet adhered in faced relationship to said corrugated sheet, said corrugated sheet being disposed between said flat sheet and said another flat sheet, a first array of parallel spaced orifices formed in said flat sheet, a second array of parallel spaced orifices formed in said corrugated sheet, orifices in said first array being disposed laterally in spaced relationship from orifices in said second array, orifices in said first array communicating with orifices in said second array through corrugations in said corrugated sheet, a third array of parallel spaced orifices formed in said another flat sheet, orifices in said third array communicating with orifices in said second array through corrugations in said corrugated sheet.

BRIEF DESCRIPTION OF THE DRAWINGS

FIG. 1 is a plan view of a side of the filter of the present invention in a particular form illustrating a corrugated sheet with an array of parallel spaced orifices formed in it;

FIG. 2 is a plan view of the filter of FIG. 1 taken from the reverse side of the view illustrated in FIG. 1;

FIG. 3 is a side elevation of the filter of FIG. 1 taken along line 3—3 of FIG. 1;

FIG. 4 is an exploded perspective view of the filter of FIG. 1;

FIG. 5 is a perspective view of a spray booth utilizing the filter of FIG. 1;

FIG. 6 is a perspective view of the filter of FIG. 1, illustrating the filter packaged in roll form; and FIG. 7 is an exploded perspective view of an alternate embodiment of the filter of the present invention.

DETAILED DESCRIPTION OF THE PREFERRED EMBODIMENT

The present invention in the embodiment illustrated in FIGS. 1-6 comprises a filter medium 10 that is suitable for use in spray booth applications and includes the provision of a flat sheet or liner 12, a corrugated sheet 14 adhered in faced relationship to flat sheet 12, a first array of parallel spaced orifices 16 formed in the flat sheet 12, and a second array of parallel spaced orifices 18 formed in the corrugated sheet 14, all as hereinafter further explained.

It will be understood that the term "coating" is used herein to include any coating material that can be applied to a surface by spray application. Such coating materials include, for example, oil or water based paints, varnishes, shellac, etc. The term "coating" is also used herein to include powder coatings as well as oils and greases that are applied to a surface by spray application.

Flat sheet 12 is a thin, flexible rectangular sheet with an elongated length and breadth and an array of parallel spaced orifices 16 formed in sheet 12 that extend over the full length and breadth of sheet 12. Sheet 12 is formed from any thin flexible material that may be paper, for example, or any other material that can be formed in thin flexible sheets that is suitable for filter applications, many such materials being known in the art. In applications wherein volatile components are carried by the fluid stream to be filtered such material is preferably constituted of a material that is non-fire supporting or is treated with a substance to render such material non-fire supporting. Such materials and treatments are well known to those skilled in the art and, consequently, need not be further described herein.

Corrugated sheet 14 is a thin flexible rectangular sheet with an elongated length and breadth and an array of parallel spaced orifices 18 formed in sheet 14 that extend over the entire length and breadth of sheet 14. Sheet 14 is also constituted of any material that is suitable for filter applications and, preferably, is constituted of the same material as flat sheet 12. Corrugated sheet 14 is adhered in faced relationship to flat sheet 12. Any suitable means for adhering sheet 14 to sheet 12 such as gluing can be used. The techniques for adhering sheet 14 to sheet 12 are dependent upon the materials being used. For example, gluing techniques are used when sheets 12 and 14 are constituted of paper or treated paper. Alternatively, should sheets 12 and 14 be constituted of a plastic material, thermo-forming techniques may be used. Equipment and procedures for forming corrugated sheets, such as sheet 14, and for adhering such corrugated sheets to flat sheets or liners, such as sheet 12, are well known to those skilled in the art and, consequently, need not be further described herein.

The faced relationship of sheets 12 and 14 defines a plurality of elongated parallel spaced channels 19 formed by the interface of the corrugations of sheet 14 and the facing of sheet 12. The corrugations of sheet 14 and, consequently, channels 19 have sufficiently large cross sections to permit the passage of a fluid stream through said channels at a relatively uniform flow rate with a relatively small loss of efficiency as the channels initially become contaminated with accumulated particles of coating materials that adhere to the interior surface thereof during filter applications. For example, channels 19 having a cross sectional area of about ⅛ by about ⅛ inches are suitable for various paint spray booth applications such as, for example, automotive paint spray booths. Larger or smaller cross sections can be used, the specific size of the cross section of such channels being dependent upon the nature of the material to be sprayed and the desired filtration rate. For example, in the filtering of fluid streams with relatively large particles, channels with larger cross sections may be required. In the filtering of a relatively fine mist at relatively low filtration rates, channels 19 with smaller cross sections may be preferred. Filter medium 10 is preferably replaced when the accumulation of particles within channels 19 causes the flow rate of fluid through medium 10 to drop below a desired level.

The orifices 16 and 18 formed in sheets 12 and 14 are sufficiently elongated to communicate with a plurality of the channels 19 to permit the flow of relatively large volumes of the fluid stream to be filtered to pass through said orifices with a relatively small pressure drop. For example, orifices 16 and 18 having dimensions of about 1 by about 3 inches are suitable for various paint spray applications. Larger or smaller orifices can be employed depending on the particular material to be filtered and the desired flow rate of the fluid stream through filter 10. Relatively rapid flow rates or fluid streams with relatively large particle sizes may require larger orifices, while relatively slow rates of flow or relatively small particle sizes may require smaller orifices. Additionally, under various advantageous conditions the orifices in corrugated sheet 14 may be smaller or larger than the orifices in flat sheet 12, or vice versa. For example, if the corrugated sheet 14 is oriented to face the direction of spray, it may be advantageous to employ larger orifices in corrugated sheet 14 than in flat sheet 12 to insure a uniform flow rate through the filter 10.

The thickness of filter 10 is governed primarily by the requirement that the channels 19 have a sufficiently large cross section to accommodate the required volumes of the fluid stream to be filtered and the anticipated particle size of particulate material of the fluid stream to be separated. The over-all shape and size of filter medium 10 is selected with regard to substantially facilitating installation of the filter medium in conventional spray booths, and enabling convenient transport and handling prior to use. Thus, filter medium 10 is preferably made equal in width to the width or breadth of the filter medium opening of the spray booth for which the filter medium is intended, and long enough so that the filter medium 10 will be equal to a convenient multiple of lengths of the filter medium opening of the spray booth for which it is to be used. Typical dimensions for filter medium 10 are about ⅜ inch in thickness, about 3 feet in width and about 30 feet in length. Since the material that sheets 12 and 14 are made of is a thin flexible material such as, for example, paper or treated paper, filter medium 10 can be cut by normal cutting or slitting operations to accommodate the dimensions of the particular spray booth for which it is to be used.

Filter medium 10 can be packaged in any form that is convenient for transporting and handling purposes. In particular, however, filter medium 10 is advantageously packaged in the form of roll 20 (FIG. 6). Appropriate lengths of filter medium 10 are cut or slit off roll 20 as required. The flexible nature of sheets 12 and 14 permit packaging of medium 10 in the form of roll 20. To form roll 20 medium 10 is rolled with the corrugations of sheet 14 extending widthwise as illustrated in FIG. 6. Filter medium 10 can be rolled in either direction, i.e., with sheet 12 facing outwardly as illustrated in FIG. 6 or, alternatively, with sheet 12 facing inwardly.

Filter 10 is installed in spray booth 22 by insertion, for example, in filter medium frame section 24 (FIG. 5). Spray booth 22 is suitable, for example, for paint spray applications and comprises spray section 26 and exhaust section 28. Filter medium 10 is placed between sections 26 and 28 of spray booth 22 so that when paint-laden air is drawn from section 26 to section 28 it passes through filter medium 10. Spray booth 22 is representative of the numerous designs and constructions of spray booths that are available to the industry. Such spray booths are entirely conventional in structure, design and operation and, being well known to those of ordinary skill in the art, need not be further described herein.

The orifices 16 and 18 of filter medium 10 are laterally disposed in spaced relationship from each other so that fluid streams passing through filter medium 10 must change direction as they pass through medium 10. In operation, paint-laden air, for example, can be filtered by initially directing the stream of paint-laden air either against corrugated sheet 14 or flat sheet 12. It has been found advantageous to place filter medium 10 with corrugated sheet 14 facing the spray area due to the fact that corrugated sheet 14 presents a larger surface area for paint to accumulate than does flat sheet 12. However, under various advantageous conditions filter medium 10 can be disposed with flat sheet 12 facing the spray area. When the filter medium 10 is disposed with corrugated sheet 14 facing the spray area, paint-laden air is directed against filter medium 10 as indicated by directional arrow 30 (FIGS. 3-5). Some of the paint accumulates on the outer facing 32 of sheet 14 while the rest of the paint in the paint-laden air stream along with the air is drawn through channels 19. Within channels 19 additional paint accumulates while air that is relatively free of paint particles is withdrawn from filter medium 10 through orifices 16. Within filter medium 10 the fluid stream changes direction twice so as to establish impingements or obstructions in the path of the fluid stream to cause the paint particles to accumulate.

Alternatively, the filter medium 10 can be oriented with flat sheet 12 facing the spray area. Under these circumstances, as paint-laden air is directed against facing 12, some of the paint accumulates on facing 12 while the rest of the paint in the air stream along with the air passes through channels 19 until the air which is relatively free of paint is withdrawn from filter medium 10 through orifices 18.

An alternate embodiment of the present invention is illustrated in FIG. 7. The filter medium of FIG. 7 is similar in design and construction to the filter medium illustrated in FIGS. 1-6 with the exception that a second flat sheet 40 is adhered in faced relationship to corrugated sheet 14. In this embodiment corrugated sheet 14 is disposed between flat sheets 12 and 40. Flat sheet 40 is constructed of the same materials and has the same dimensions as flat sheet 12. Flat sheet 40 has an array of parallel spaced orifices 42 formed in it that extend throughout the entire length and breadth of sheet 40. Flat sheet 40 is adhered to sheet 14 in the same manner and with the same techniques as sheet 12 is adhered to sheet 14. The faced relationship of sheets 14 and 40 defines a plurality of elongated parallel spaced channels 44 formed by the interface of the corrugations of sheet 14 and the facing of sheet 40. Orifices 42 are laterally spaced from orifices 18 so that fluid streams entering orifices 42 must change direction within channels 44 prior to passing through orifices 18 as indicated by directional arrow 46.

The embodiment illustrated in FIG. 7 provides two sets of elongated parallel spaced channels which the fluid stream being filtered must pass through. One set of these channels is defined by the interface of flat sheet 12 and corrugated sheet 14 (in the same manner as the embodiment illustrated in FIGS. 1-6) and the other set is defined by the interface of flat sheet 40 and corrugated sheet 14. The orifices 16, 18 and 42 are laterally spaced in such a manner so that the fluid streams passing through the filter medium, as indicated by directional arrow 46, must change direction four times. In operation paint-laden air, for example, is directed against either flat sheet 12 or flat sheet 40, passes through either orifices 16 or 42, some of the paint accumulating on the outer facing of sheet 12 or 40, the remainder of the paint along with the air changing direction and passing through either channel 19 or 44, some of the paint accumulating in such channel, the air and the remainder of the paint passing through orifices 18 and changing direction to pass through channels 44 or 19 (whichever is downstream of the direction of flow), the air passing through said channel and thereafter leaving the filter medium through either orifices 42 or 16, the air withdrawn from the filter medium being relatively free of paint particles. The embodiment illustrated in FIG. 7 is preferably packaged in flat elongated sheets.

To achieve a more efficient removal of particulate matter from the fluid stream being filtered, additional layers of the filter medium illustrated in FIGS. 1–6 or FIG. 7 can be employed. Additionally, since the filter medium of the present invention is relatively economical and easy to replace it can be facilitatingly employed with other filters. For example, under various advantageous conditions the filter medium of the present invention is used as a primary filter with other more expensive filters such as, for example, electrostatic devices, being used downstream of the filter of the present invention.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A filter impingement and deflection medium comprising
   a flat sheet,
   a corrugated sheet adhered in faced relationship to said flat sheet, the faced relationship of said flat sheet and said corrugated sheet defining a plurality of elongated channels formed between said flat sheet and said corrugated sheet,
   a first array of parallel spaced orifices formed in said flat sheet, and
   a second array of parallel spaced orifices formed in said corrugated sheet,
   the orifices in said first array being disposed laterally in spaced relationship from the orifices in said second array, the orifices in said first array communicating with the orifices in said second array through said channels, the orifices in said flat sheet and corrugated sheet and said channels having sufficiently large cross sections to permit the passage of fluid through said orifices and channels, the orifices in said flat sheet and corrugated sheet being sufficiently elongated to communicate with a plurality of said channels.

2. A filter medium of claim 1 further comprising another flat sheet adhered in faced relationship to said corrugated sheet, said corrugated sheet being disposed between said flat sheet and said another flat sheet, said another flat sheet having a plurality of said orifices formed in it.

3. The filter medium of claim 2 wherein the orifices formed in said another flat sheet comprise a third array of parallel spaced orifices, the orifices in said third array communicating with the orifices in said second array through the corrugations in said corrugated sheet.

4. The filter medium of claims 2 or 3 wherein said another flat sheet is a thin flexible sheet with an elongated length and breadth.

5. The filter medium of claims 2 or 3 wherein said flat sheet, said corrugated sheet and said another flat sheet are formed of the same material.

6. The filter medium of claims 2 or 3 wherein said flat sheet, said corrugated sheet and said another flat sheet are made of paper.

7. The filter medium of claims 2 or 3 wherein said flat sheet, said corrugated sheet and said another flat sheet have substantially equal lengths and breadths.

8. The filter medium of claim 1 wherein said flat sheet is a thin flexible sheet with an elongated length and breadth.

9. The filter medium of claim 1 wherein said flat sheet and said corrugated sheet are made of paper.

10. The filter medium of claim 1 wherein said corrugated sheet is formed from a thin flexible sheet with an elongated length and breadth.

11. The filter medium of claim 1 wherein said flat sheet and said corrugated sheet have substantially equal lengths and breadths.

12. A process for separating suspended particles from a fluid stream comprising
   (a) providing a filter having a flat sheet, a corrugated sheet adhered in faced relationship to said flat sheet, the faced relationship of said flat sheet and said corrugated sheet defining a plurality of elongated channels formed between said flat sheet and said corrugated sheet, a first array of parallel spaced orifices formed in said flat sheet, and a second array of parallel spaced orifices formed in said corrugated sheet, the orifices in said first array being disposed laterally in spaced relationship from the orifices in said second array, the orifices in said first array communicating with the orifices in said second array through the channels formed between said corrugated sheet and said flat sheet, the orifices in said flat sheet and corrugated sheet and said channels having sufficiently large cross sections to permit the passage of fluid through said orifices and channels, the orifices in said flat sheet and said corrugated sheet being sufficiently elongated to communicate with a plurality of said channels;
   (b) projecting said fluid stream against the corrugated sheet of said filter;
   (c) accumulating a portion of the particles in said fluid stream on the facing of said corrugated sheet which the fluid stream was projected against;
   (d) passing said fluid stream through the orifices of said corrugated sheet;
   (e) diverting the flow of said fluid stream into the channels formed between said flat sheet and said corrugated sheet;
   (f) accumulating another remaining portion of the particles of said fluid stream in said channels; and
   (g) withdrawing said fluid stream from said filter through the orifices in said flat sheet.

13. A process for separating suspended particles from a fluid stream comprising the steps of
   (a) providing a filter having a flat sheet, a corrugated sheet adhered in faced relationship to said flat sheet, the faced relationship of said flat sheet and said corrugated sheet defining a plurality of elongated channels formed between said flat sheet and said corrugated sheet, a first array of parallel spaced orifices formed in said flat sheet, and a second array of parallel spaced orifices formed in said corrugated sheet, the orifices in said first array being disposed laterally in spaced relationship from the orifices in said second array, the orifices in said first array communicating with the orifices in said second array through the channels formed between said corrugated sheet and said flat sheet, the orifices in said flat sheet and corrugated sheet and said channels having sufficiently large cross sections to permit the passage of fluid through said orifices and channels, the orifices in said flat sheet and said corrugated sheet being sufficiently elongated to communicate with a plurality of said channels:
(b) projecting said fluid stream against the flat sheet of said filter;
(c) accumulating a portion of the particles in said fluid stream on the facing of said flat sheet which the fluid stream was projected against;
(d) passing said fluid stream through the orifices of said flat sheet;
(e) diverting the flow of said fluid stream into the channels formed between said flat sheet and said corrugated sheet;
(f) accumulating another remaining portion of the particles of said fluid stream in said channels; and
(g) withdrawing said fluid stream through the orifices in said corrugated sheet.

14. The process of claims 12 or 13 wherein said fluid stream comprises a mixture of air and atomized particles of a coating material.

15. The process of claims 12 or 13 wherein said fluid stream comprises a mixture of air and suspended particles of paint.

16. The process of claims 12 or 13 wherein said flat sheet is a thin flexible sheet with an elongated length and breadth.

17. The process of claims 12 or 13 wherein said flat sheet and said corrugated sheet are made of paper.

18. The process of claims 12 or 13 wherein said corrugated sheet is formed from a flat thin flexible sheet with an elongated length and breadth.

19. A disposable roll of an impingment and deflection filter medium, said filter medium form comprising
a flat flexible sheet,
a corrugated sheet adhered in faced relationship to said flat sheet, the faced relationship of said flat sheet and said corrugated sheet defining a plurality of elongated channels formed between said flat sheet and said corrugated sheet,
a first array of parallel spaced orifices formed in said flat sheet, and
a second array of parallel spaced orifices formed in said corrugated sheet,
the orifices in said first array being disposed laterally in spaced relationship from the orifices in said second array, the orifices in said first array communicating with the orifices in said second array through said channels, the orifices in said flat sheet and corrugated sheet and said channels having sufficiently large cross sections to permit the passage of fluid through said orifices and channels, the orifices in said flat sheet and said corrugated sheet being sufficiently elongated to communicate with a plurality of said channels.

20. The roll of claim 19 wherein said flat sheet is a thin flexible sheet with an elongated length and breadth.

21. The roll of claim 19 wherein said flat sheet and said corrugated sheet are made of paper.

22. The roll of claim 19 wherein said corrugated sheet is formed from a flat thin flexible sheet with an elongated length and breadth.

23. The roll of claim 19 wherein said flat sheet and said corrugated sheet have substantially equal lengths and breadths.

24. In a spray booth having an impingement and deflection filter medium, said filter medium comprising
a flat sheet,
a corrugated sheet adhered in faced relationship to said flat sheet, the faced relationship of said flat sheet and said corrugated sheet defining a plurality of elongated channels formed between said flat sheet and said corrugated sheet,
a first array of parallel spaced orifices formed in said flat sheet, and
a second array of parallel spaced orifices formed in said corrugated sheet,
the orifices in said first array being disposed laterally in spaced relationship from the orifices in said second array, the orifices in said first array communicating with the orifices in said second array through said channels, the orifices in said flat sheet and corrugated sheet and said channels having sufficiently large cross sections to permit the passage of fluid through said corrugations, the orifices in said flat sheet and said corrugated sheet being sufficiently elongated to communicate with a plurality of said channels.

25. The spray booth of claim 24 further comprising another flat sheet adhered in faced relationship to said corrugated sheet, said corrugated sheet being disposed between said flat sheet and said another flat sheet, said another flat sheet having a plurality of said orifices formed in it.

26. The spray booth of claim 25 wherein said another flat sheet is a thin flexible sheet with an elongated length and breadth.

27. The spray booth of claim 25 wherein said flat sheet, said corrugated sheet and said another flat sheet are formed of the same material.

28. The spray booth of claim 25 wherein said flat sheet, said corrugated sheet and said another flat sheet are made of paper.

29. The spray booth of claim 25 wherein said flat sheet, said corrugated sheet and said another flat sheet have substantially equal lengths and breadths.

30. The spray booth of claim 24 wherein said flat sheet is a thin flexible sheet with an elongated length and breadth.

31. The spray booth of claim 24 wherein said flat sheet and said corrugated sheet are made of paper.

32. The spray booth of claim 24 wherein said corrugated sheet is formed from a flat thin flexible sheet with an elongated length and breadth.

33. The spray booth of claim 24 wherein said flat sheet and said corrugated sheet having substantially equal lengths and breadths.

* * * * *